United States Patent
Nakazawa et al.

(10) Patent No.: US 6,671,165 B1
(45) Date of Patent: Dec. 30, 2003

(54) ELECTRIC DOUBLE LAYER CAPACITOR AND PRODUCTION METHOD THEREOF

(75) Inventors: Yutaka Nakazawa, Tokyo (JP); Koji Sakata, Tokyo (JP); Kazuya Mimura, Tokyo (JP); Takashi Yasuda, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 09/652,063

(22) Filed: Aug. 31, 2000

(51) Int. Cl.[7] ................................................ H01G 9/00
(52) U.S. Cl. ...................................... 361/502; 29/25.03
(58) Field of Search ................................ 361/502, 508, 361/512, 511, 516; 29/25.03

(56) References Cited

U.S. PATENT DOCUMENTS

| | | | |
|---|---|---|---|
| 3,656,027 A | | 4/1972 | Isley |
| 5,115,378 A | * | 5/1992 | Tsuchiya et al. ............ 361/502 |
| 5,381,303 A | * | 1/1995 | Yoshida et al. ............. 361/502 |
| 5,682,288 A | * | 10/1997 | Wani ......................... 361/502 |
| 5,953,204 A | * | 9/1999 | Suhara et al. ............... 361/502 |
| 6,064,561 A | * | 5/2000 | Harada et al. .............. 361/502 |

FOREIGN PATENT DOCUMENTS

| | | |
|---|---|---|
| JP | 47-13581 | 7/1972 |
| JP | 7-335494 | 12/1995 |
| JP | 10-004033 | 1/1998 |
| JP | 11-162787 | 6/1999 |
| KR | 1991-0005343 | 3/1991 |
| KR | 1991-0016021 | 9/1991 |
| WO | 97/25728 | 7/1997 |

\* cited by examiner

*Primary Examiner*—Anthony Dinkins
(74) *Attorney, Agent, or Firm*—Katten Muchin Zavis Rosenman

(57) ABSTRACT

A separator, a pair of polarized electrodes, gaskets holding the separator and the polarized electrodes from their sides, and a pair of the collectors provided in contact with the outer surfaces of polarized electrodes and gaskets are provided in an electric double layer capacitor. The collectors are a lamination having a conductive film formed by coating a conductive resin solution containing a conductive material to at least one surface of copper foil.

5 Claims, 1 Drawing Sheet

HEATING

ELECTRIC DOUBLE LAYER CAPACITOR AND PRODUCTION METHOD THEREOF

BACKGROUND OF THE INVENTION

1. Field of the Invention

The present invention relates to an electric double layer capacitor wherein a dry up phenomenon and Equivalent Series of Resistance (which is hereinafter called "ESR") are reduced, and a production method thereof.

This application is based on Japanese Patent Application No. Hei 11-250918, the contents of which are incorporated herein by reference.

2. Description of Related Art Including Information Disclosed Under 37 CFR 1.97 and 37 CFR 1.98

An electric double layer capacitor is small and has large capacity for charge, and has mainly been used for backup of memory or similar. The aim recently has been to develop into some technical fields in which large amounts of current are required such as automobiles, electronic equipment, or similar; research and development with regard to properties of the electric double layer capacitor, particularly, reduction of the ESR has been actively carried out.

FIG. 2 is a sectional side elevation showing an example of a conventional electric double layer capacitor. This electric double layer capacitor has non-electron-conductivity and is composed mainly of a separator 11 made of a porous film having ionic permeability, a pair of polarized electrodes 12 face each other onto a separator 11 and are composed of powdered active carbon or active carbon fiber, or a solid material obtained by solidifying active carbon using a binder "Teflon", a phenol resin, or the like wherein an electrolytic solution permeates into the solid material, gaskets 13 for holding the separator 11 and polarized electrodes 12 from their sides, and a pair of collectors 14 arranged on the outer surfaces of polarized electrodes 12, not on the side of the surface contacting the separator 11, and made of a conductive resin applied conductivity by mixing carbon powder or the like.

Recently, in the field of electronics, equipment has been further miniaturized; consequently, a thin type electric double layer capacitor has been necessary.

If the collector 14 is prepared thinly in order to make the electric double layer capacitor thin, gas permeability of the collector 14 increases. Then, a dry up phenomenon in the electrolytic solution occurs, so that the capacity of the electric double layer capacitor is reduced and the ESR increases.

If the electric double layer capacitor is used requiring a large amount of current, in order to run a large amounts of current from the electric double layer capacitor, it is necessary that the ESR be reduced as much as possible and a voltage drop caused by the ESR is reduced.

However, in a conventional electric double layer capacitor, adhesion of an interface between the collector 14 and the polarized electrode 12 is insufficient and contact resistance therebetween is high, therefore, a problem of the increase in the ESR occurs.

In order to solve the problem of adhesion at each interface between the collectors 14 and the polarized electrodes 12 respectively, an electric double layer capacitor having a conductive butyl rubber which has excellent adhesion to the polarized electrodes 12, as a collector, is disclosed in Japanese Unexamined Patent Application, First Publication, No.7-335494 (Kokai). Furthermore, in order to reduce the ESR, JP 7-335494 discloses the electric double layer capacitor having laminated metal sheets, as a collector, made of metal sheet, for example, aluminum, on which a conductive butyl rubber is laminated.

However, the laminated metal sheet used in the above electric double layer capacitor has insufficient adhesion at the interface between the aluminum sheet and the conductive butyl rubber, so that the contact resistance is large. Particularly, since peeling tends to occur at the interface between the aluminum sheet and the conductive butyl sheet by heating when pressing and adhering the collectors to the gaskets, the contact resistance increases further. Furthermore, as shown in FIG. 3, a conductive material 16 such as carbon particles which is around the surface layer of the conductive butyl sheet 15, is easily moved into the inside of the conductive butyl sheet 15 by heating at high temperature when laminating. Subsequently, in the conductive butyl sheet 15, conductivity may reduce and the ESR may increase.

In the laminated metal sheet composed of the aluminum sheet and the conductive butyl sheet, contact resistance at the interface between the aluminum sheet and the conductive butyl rubber is large and conductivity of the conductive butyl rubber tends to reduce by heating at high temperature when laminating the conductive butyl rubber on the aluminum sheet. Therefore, when a laminated metal sheet is used as a collector, it is difficult that the electric double layer capacitor having low ESR is constantly obtained.

Furthermore, in the above electric double layer capacitor, it was expected to reduce the dry up phenomenon of the electrolytic solution using an aluminum sheet. However, insufficient adhesion at the interface between the aluminum sheet and the conductive butyl rubber causes the dry up phenomenon of the electrolytic solution from the interface and an expected effect, reduction of the dry tip phenomenon could not be obtained.

BRIEF SUMMARY OF THE INVENTION

It is an object of the present invention is to provide an electric double layer capacitor wherein a dry up phenomenon of the electrolytic solution and the ESR are reduced and a production method thereof.

In order to achieve the above objects, the present inventors have diligently carried out research with regard to an adhesion of metal foil and a conductive resin and a method for laminating the conductive resin onto the metal foil, and found that the adhesion of the metal foil and the conductive resin containing a conductive material is improved using a copper foil as a metal foil and the conductivity of the conductive resin is not reduced by forming a conductive film coated with the conductive resin on the copper foil, as a result, the present invention is accomplished.

The electric double layer capacitor of the present invention comprises a separator, a pair of polarized electrodes provided on both sides of the separator, gaskets holding the separator and the polarized electrodes from their sides, and a pair of collectors provided in contact with the outer surfaces of the polarized electrodes and the gaskets, wherein the collectors are a lamination comprising a conductive film formed by coating a conductive resin solution containing a conductive material on at least one surface of a copper foil.

According to the above capacitor, the dry up phenomenon of the electrolytic solution and the ESR are reduced.

The surfaces of the conductive film sides of the collectors may contact to the polarized electrodes.

According to the above construction, adhesion of the collector and the polarized electrode is improved, the contact resistance of the interface between the collector and the polarized electrode is reduced, and the ESR of the electric double layer capacitor is reduced.

Moreover, a resin used in the conductive resin solution may be a styrene-ethylene/butylene-styrene copolymer (SEBS) or an ethylene-propylene-dienemonomer elastomer (EPDM).

According to the above construction, the ESR is further reduced.

The conductive material may be made of graphite or carbon.

According to the above construction, excellent chemical stability is obtained and maintained for a long time without increasing the resistance of the conductive film.

Furthermore, a production method for electric double layer capacitor of the present invention to prepare an electric double layer capacitor comprising a separator, a pair of polarized electrodes provided on both sides of the separator, gaskets holding the separator and the polarized electrodes from their sides, and a pair of collectors provided in contact with the outer surfaces of the polarized electrodes and the gaskets, wherein a conductive resin solution containing a conductive material is coated to at least one surface of copper foil and a conductive film is formed to the surface of copper foil in the collectors.

According to the above production method, the dry up phenomenon of the electrolytic solution and the ESR are reduced.

DETAILED DESCRIPTION OF THE INVENTION

The present invention is explained with reference to figures as follows.

Figure 1:
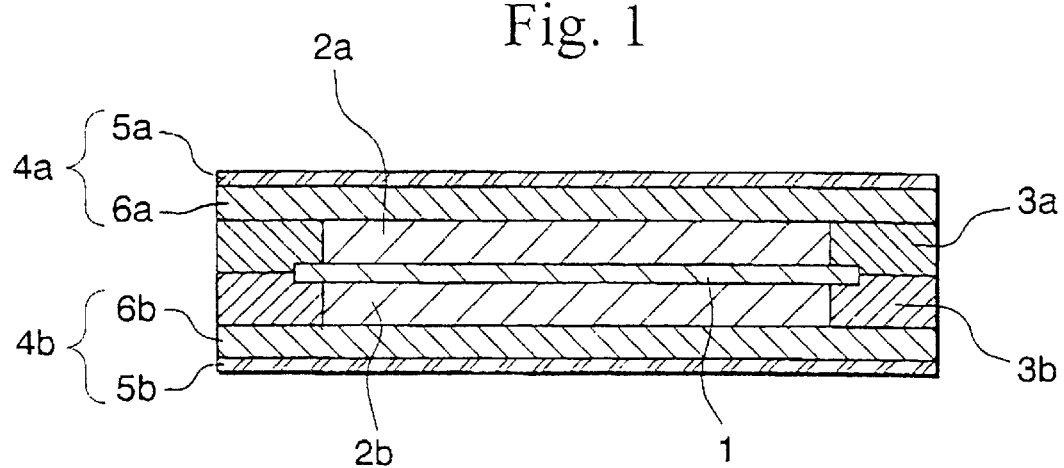
FIG. 1 is a sectional side elevation showing an example of an electric double layer capacitor of the present invention.
Figure 2:
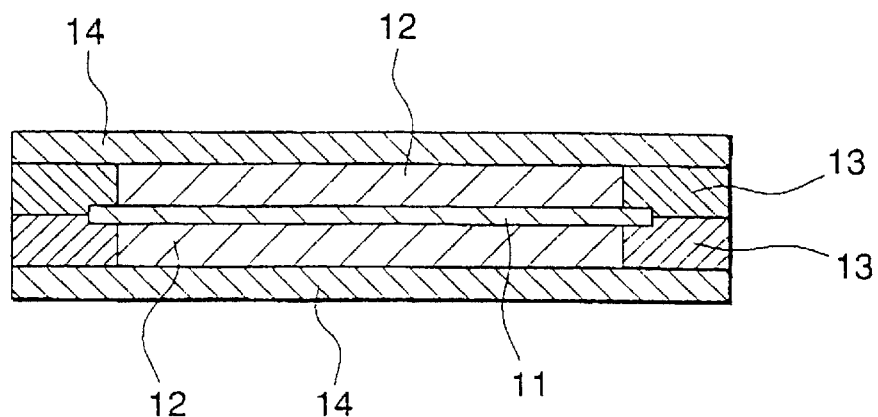
FIG. 2 is a section side elevation showing an example of a conventional electric double layer capacitor.
Figure 3:
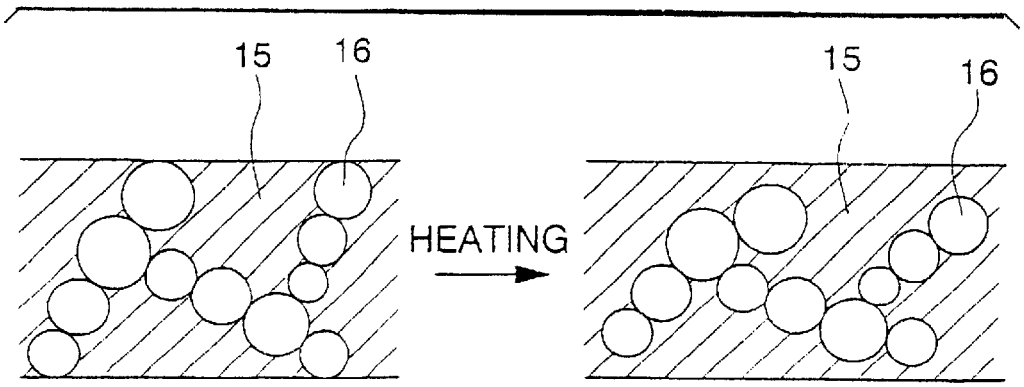
FIG. 3 is a schematic view showing transference by heating of a conductive material in a conductive butyl rubber sheet.

FIG. 1 shows a schematic view of an example of the electric double layer capacity of the present invention. This electric double layer capacitor is composed of a separator 1, a pair of polarized electrodes 2a, 2b provided on both sides of the separator 1, gaskets 3a, 3b provided in contact with the side surfaces of the separator 1 and the electrodes 2a, 2b, and a pair of collectors 4a, 4b provided in contact with the outer surfaces of the polarized electrodes 2a, 2b and the gaskets 3a, 3b.

In the electric capacitor, the collectors 4a and 4b are laminates composed of copper foils 5a and 5b, and conductive films 6a and 6b formed by coating a conductive resin solution containing a conductive material to the surfaces of the copper foils 5a and 5b, respectively. Furthermore, the collectors 4a and 4b are provided to contact the conductive films 6a and 6b side surfaces with the polarized electrodes 2a and 2b.

As the separator 1, porous film having properties of non-electron conductivity and ionic permeability is used; however, this is not particularly limited. For example, a sheet made of polypropylene, polyethylene, glass fiber, or the like is used as a porous film.

As the polarized electrodes 2a and 2b, a material having conductivity, stability to electrolytic solution, and large surface area is preferably used; for example, powdered active carbon or fibrous active carbon is used. These active carbons are solidified by a binder such as "Teflon", a phenol resin, or the like to be solid polarized electrodes; the solid polarized electrodes are permeated of an electrolytic solution and then used. As the electrolytic solution, aqueous electrolytic solutions dissolved sulfuric acid, potassium hydroxide, or the like in water, or organic electrolytic solutions dissolved quaternary ammonium salt as an electrolyte in organic solvent such as propylene carbonate or the like, is used.

The above gaskets 3a and 3b hold a shape of the electric double layer capacitor, prevent the electrolytic solution from leaking, and avoid occurring short circuit by contacting the collectors 4a and 4b each other. For example, a resin material such as ABS, butyl rubber, polyolefin resin, or the like is used in the gaskets 3a and 3b.

As metal foil in the collectors 4a and 4b, copper foil is used because copper has superior adhesion to the conductive resin containing a conductive material such as carbon particles to other metals such as aluminum. Furthermore, copper is effective in an impedance than other metals such as aluminum.

A resin used in the above conductive resin solution is not particularly limited if the resin is dissolved in solvent and its film can be formed, for example, polypropylene, polyethylene, polyvinyl chloride, polyvinylidene chloride, polyurethane, styrene-ethylene/butylene-styrene copolymer (SEBS), ethylene-propylene-dienemonomer elastomer (EPDM), and the like can be used. Particularly, SEBS and EPDM are preferably used because they have excellent adhesion to the copper foil 5a and 5b.

Furthermore, the above conductive material is not particularly limited if the material can be used for the electric double layer capacitor, preferably, graphite or carbon is used in light of low resistance, film forming property, and chemical stability. The conductive material is preferably 40 to 80% by weight in the conductive films 6a and 6b.

The solvent used in the conductive resin solution is not particularly limited if it dissolves the above resin. For example, if the resin is SEBS, toluene is preferably used as the solvent.

A product method of the electric double layer capacitor of the present invention is explained as follows.

First, the conductive resin solution containing the conductive material is coated on the surface of the copper foil 15 and dried to prepare the collector 4a on which the conductive film 6a is formed on the surface of the copper film 5a.

The surface of the conductive film 6a side of the collector 4a and one opening end surface of the gasket 3a are adhered and the polarized electrode 2a containing the electrolytic solution is filled into the gasket 3a, so that the first electrode-filling sheet is obtained. Similarly, the second electrode-filling sheet can be obtained.

An exposed surface of the polarized electrode 2a of the first electrode-filling sheet is covered and sealed by the separator 1 and the first and second electrode-filling sheets are joined so that the separator 1 is between the polarized electrodes 2a and 2b, sequentially, a layered sheet can be obtained.

Sequentially, the layered sheet is heated with pressure. The electric double layer capacitor is obtained by joining with pressure the gasket 3a of the first electrode-filling sheet and the collector 4a, the gasket 3b of the second electrode-filling sheet and the collector 4b, and the gasket 3a of the first electrode-filling sheet and the gasket 3b of the second electrode-filling sheet.

As a coating method for coating the conductive resin solution to the copper foils 5a and 5b, a spray method, doctor blade method, or the like are enumerated.

Additionally, the production method of the electric double layer of the present invention is not limited of the above methods as long as the step of preparing the collector by coating the conductive resin solution to the surface of the copper foil is comprised.

In the electric double layer capacitor, since the copper foils 5a and 5bare used as metal foil, the copper foils are tightly joined to the conductive films 6a and 6b containing the conductive material and the contact resistance at the interface between the copper foils 5a and 5b, and the conductive films 6a and 6b, respectively can be reduced, so that the ESR of the electric double layer capacitor can be reduced.

Furthermore, since the collectors 4a and 4b comprises non-gas permeable copper foils 5a and 5b and the copper foils 5a and 5b are tightly joined the conductive films 6a and 6b, the dry up phenomenon of the electrolytic solution is hardly occurred from the surfaces of the collectors 4a and 4b, and the interfaces between the copper 5a and 5b, and the conductive films 6a and 6b, respectively. Therefore, the capacity of the electric double layer capacitor hardly reduces and the ESR hardly increases, accordingly, thin type electric double layer capacitor can be obtained.

Since the collectors 4a and 4b are arranged so that the surfaces of the conductive films 6a and 6b contact to the polarized electrodes 2a and 2b, the collectors 4a and 4b are tightly joined to the polarized electrodes 2a and 2b, the contact resistance at the interface between the collectors 4a and 4b and the polarized electrodes 2a and 2b, respectively can be reduced, and the ESR of the electric double layer capacitor can be reduced.

Moreover, since the conductive films 6a and 6b are formed on the copper foils 5a and 5b by coating, the conductive films 6a and 6b are not heated at high temperature when laminating and the conductive material around the surface layer of the conductive films 6a and 6b is not moved to the inside of the conductive film. Therefore, the conductivity of the conductive films 6a and 6b and the ESR of the electric double layer capacitor does not increase.

EXAMPLES

Examples are described as follows.

The following are evaluation methods of the present invention.

Evaluation of Adhesion

A collector comprising conductive film having 20 μm thickness was prepared as a sample by coating the metal foil with conductive resin solution using the doctor blade method and drying the coated metal foil. With regard to this sample, adhesion was evaluated according to JIS H 8504-1998 (peeling test method).

Concretely, in a square, 25 mm each side, on the surface of the metal foil, 25 squares, 4.6 mm each side, of the conductive film were formed with the interval 0.5 mm between adjacent sides and lengthwise and crosswise five lines. An adhesive tape (JIS Z 1522) was stuck on these conductive films and sequentially peeled off, and the numbers of conductive films peeled from the metal foil were counted.

ESR Measurement

An alternating current having a frequency measured: 1 kHz and voltage: 10 mV rms was applied to the electric double layer capacitor and a real part of impedance was calculated.

Capacity Measurement

After charging the electric double layer capacitor by applying 0.8V voltage for 30 minutes, constant current discharge 10 mA was carried out and the capacity was calculated with voltage variation ($\Delta V/\Delta t$) between capacitor terminals discharge per unit of time (t) on discharge process by the following formula (1).

$$C = i \times (\Delta t / \Delta V) \quad (i = 10 \text{ mA}) \tag{1}$$

Example 1

Preparing a Sample for Evaluating Adhesion 100 parts by weight SEBS were dissolved in 300 parts by weight toluene and 50 parts by weight carbon particles were added in the solution to obtain the conductive resin solution.

The sample for evaluating adhesion was obtained by coating conductive resin solution to the surface of the 50 μm copper foil by the doctor blade method and drying the coated copper foil at 120° C. for 5 minutes. Five samples were prepared and each was evaluated about adhesion. The results are shown in Table 1.

Manufacturing an Electric Double Layer Capacitor

The collector 4a in which the conductive film 6a having 20 μm thickness was formed to the surface of the copper foil 5a, was obtained by coating the above conductive resin solution to the surface of the 50 μm copper foil by the doctor blade method and drying the coated copper foil at 120° C. for 5 minutes. By mixing 60% by weight powder active carbon and 40% by weight sulfuric acid solution, active carbon paste was prepared.

Sequentially, the surface of the conductive film 6a side of the collector 4a was joined to one opening end surface of the gasket 3a. The above active carbon paste was filled into the gasket 3a to be a polarized electrode 2a, so that the first electrode-filling sheet was obtained. Similarly, the second electrode-filling sheet was obtained.

An exposed surface of the polarized electrode 2a of the first electrode-filling sheet was sealed by covering with the separator 1 composed of porous polypropylene and the first electrode-filling sheet and the second electrode-filling sheet were joined so as to the separator I was between the polarized electrodes 2a and 2b, so that a layered sheet was obtained.

Sequentially, the layered sheet was heated up to 125° C. with a pressure 7 kg/cm2 and the gasket 3a of the first electrode-filling sheet and the collector 4a, the gasket 3b and the collector 4b, and the gasket 3a of the first electrode-filling sheet and the gasket 3b of the second electrode-filling sheet were joined with pressure, so that the electric double layer capacitor was obtained.

The ESR of the electric double layer capacitor was measured. The results are shown in Table 2. Furthermore, high temperature loading test (loading with 0.8 V under 85° C. for 500 hours) was carried out, the ESR and the capacitor of the capacitor after the test, and each rate of change of the ESR and the capacitor were calculated. The results are shown in Table 2.

Example 2

Except an EPDM was used for the SEBS, adhesion was evaluated by the same way of Example 1. The results are shown in Table 1.

Similarly, except the EPDM was used for the SEBS, the electric double layer capacitor was manufactured and evaluated according to the way of Example 1. The results are shown in Table 2.

Comparative Example 1

Except aluminum foil was used for the copper foil of a thickness 50 μm, adhesion was evaluated in the same way of Example 1. The results are shown in Table 1.

Similarly, except the aluminum foil was used for the copper foil of a thickness 50 μm, the electric double layer capacitor was manufactured and evaluated according to the same way as Example 1. The results are shown in Table 2.

Comparative Example 2

As a collector, except a conductive butyl rubber sheet of a thickness 100 μm containing 50% by weight carbon particles, the electric double layer capacitor was manufactured and evaluated according to the way of Example 1. The results are shown in Table 2.

TABLE 1

| Sample | Example 1 Peeling number/25 | Example 2 Peeling number/25 | Comparative Example 1 Peeling number/25 |
|---|---|---|---|
| 1 | 4 | 5 | 7 |
| 2 | 2 | 3 | 6 |
| 3 | 5 | 1 | 7 |
| 4 | 4 | 2 | 8 |
| 5 | 3 | 6 | 5 |
| Average | 3.6 | 3.4 | 6.6 |

TABLE 2

| | Initial ESR before loading at high temperature (mΩ) | Rate of change of ESR after loading at high temperature (time) | Rate of change of voltage after loading at high temperature (%) |
|---|---|---|---|
| Example 1 | 48 | 1.1 | −1 |
| Example 2 | 46 | 1.1 | −2 |
| Comparative Example 1 | 86 | 1.6 | −6 |
| Comparative Example 2 | 50 | 3.0 | −15 |

As shown in Table 1, in comparison with the copper foil and the aluminum foil, the copper foil is superior to the aluminum foil in adhesion to the conductive film.

Furthermore, as shown in Table 2, the electric double layer capacitor comprising the collector composed of aluminum foil and conductive film has larger initial ESR than that of the electric double layer capacitor comprising the collector composed of copper foil and conductive film, and further, the ESR after loading at high temperature and the rate of change of voltage of the capacitors using the aluminum foil are greater than those of the capacitors using the copper foil. Insufficient adhesion of the interface between the aluminum foil and the conductive film causes great contact resistance at the interface and a dry up phenomenon occurs from the interface.

What is claimed is:

1. An electric double layer capacitor comprising a separator, a pair of polarized electrodes provided on both sides of the separator, gaskets holding the separator and the polarized electrodes from their sides, and a pair of collectors provided in contact with the outer surfaces of the polarized electrodes and the gaskets, wherein the collectors are a lamination comprising a conductive film formed by coating a conductive resin solution containing a conductive material on at least one surface of a copper foil.

2. An electric double layer capacitor according to claim 1, wherein surfaces of the conductive film sides of the collectors contact to the polarized electrodes.

3. An electric double layer capacitor according to claim 1, wherein a resin in the conductive resin solution is a styrene-ethylenelbutylene-styrene copolymer (SEBS) or an ethylene-propylene-dienemonomer elastomer (EPDM).

4. An electric double layer copacitor according to claim 1, wherein the conductive material is graphite or carbon.

5. A production method for electric double layer capacitor of the present invention to prepare an electric double layer capacitor comprising a separator, a pair of polarized electrodes provided on both sides of the separator, gaskets holding the separator and the polarized electrodes from their sides, and a pair of collectors provided in contact with the outer surfaces of the polarized electrodes and the gaskets, wherein a conductive resin solution containing a conductive material is coated to at least one surface of copper foil and a conductive film is formed to the surface of copper foil in the collectors.

* * * * *

UNITED STATES PATENT AND TRADEMARK OFFICE
CERTIFICATE OF CORRECTION

PATENT NO.    : 6,671,165 B1
DATED         : December 30, 2003
INVENTOR(S)   : Y. Nakazawa et al.

It is certified that error appears in the above-identified patent and that said Letters Patent is hereby corrected as shown below:

<u>Title page,</u>
Item [30], Foreign Application Priority Data, add the following:
-- September 3, 1999    (JP)    11-250918 --

Signed and Sealed this

Sixth Day of July, 2004

JON W. DUDAS
*Acting Director of the United States Patent and Trademark Office*